United States Patent [19]
Smith

[11] 3,840,077
[45] Oct. 8, 1974

[54] MULTI-USE UTILITY VEHICLE
[76] Inventor: Jimmie D. Smith, 417 Hanover, Irving, Tex. 75062
[22] Filed: Nov. 15, 1972
[21] Appl. No.: 306,515

Related U.S. Application Data
[63] Continuation-in-part of Ser. No. 167,349, July 29, 1971, Pat. No. 3,770,070.

[52] U.S. Cl............ 172/258, 172/259, 172/364, 180/19 R
[51] Int. Cl............................................ A01b 69/00
[58] Field of Search....... 172/4, 364, 362, 258, 259, 172/260, 246, 247, 253, 667, 741, 743; 180/19 R

[56] References Cited
UNITED STATES PATENTS
1,245,121  10/1917  Peters.............................. 172/259
2,597,622  5/1952  Davis............................. 172/364 X
2,776,533  1/1957  Yacoby............................ 180/19 R
3,166,141  1/1965  Shields et al...................... 180/19 R
3,661,212  5/1972  Johnson............................ 172/258

Primary Examiner—Stephen C. Pellegrino

[57] ABSTRACT

A power driven mobile multi-use utility vehicle for the multiple purposes of: (1) cultivating and soil movement by a selected tool that is manually or power controlled by the operator who follows and guides the mobile unit, (2) moving other vehicles, such as house trailers, and (3) transporting small loads. An especially constructed universal joint permits the selected tool to be replaced or changed in its angle of application to fit operational conditions.

9 Claims, 6 Drawing Figures

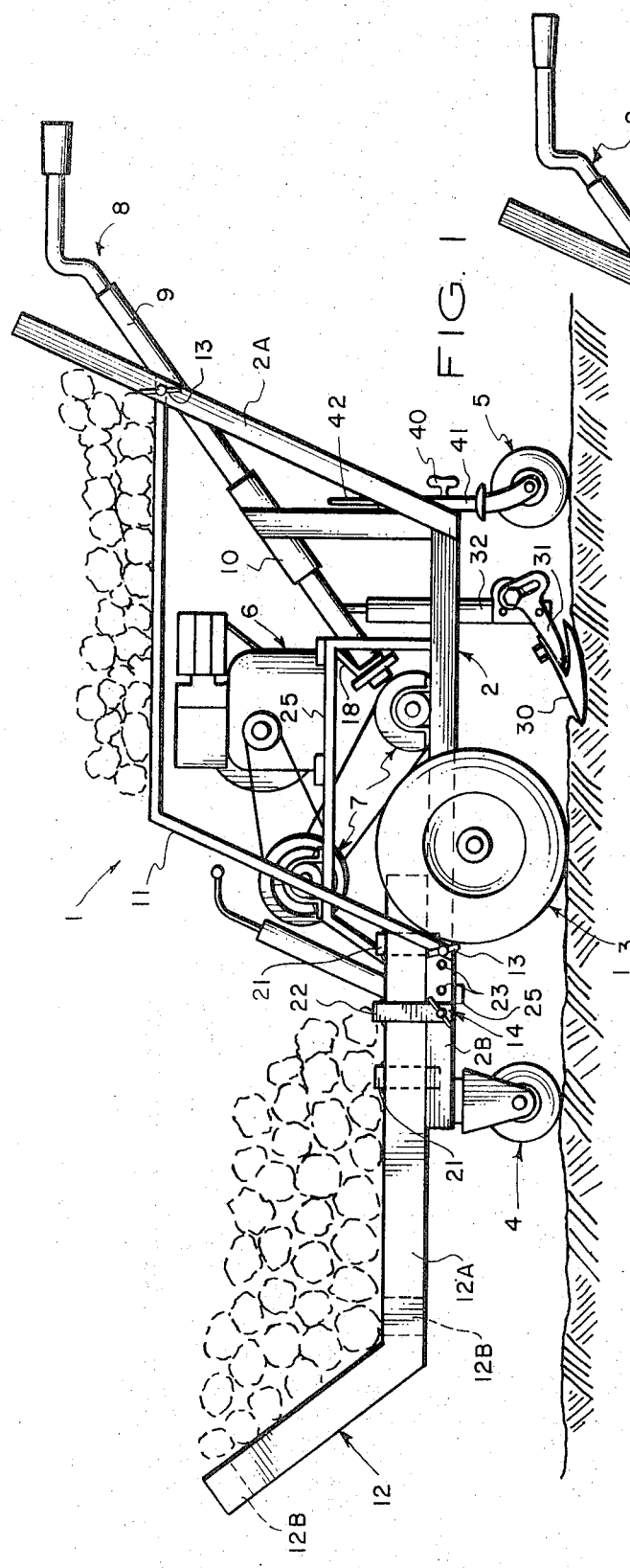
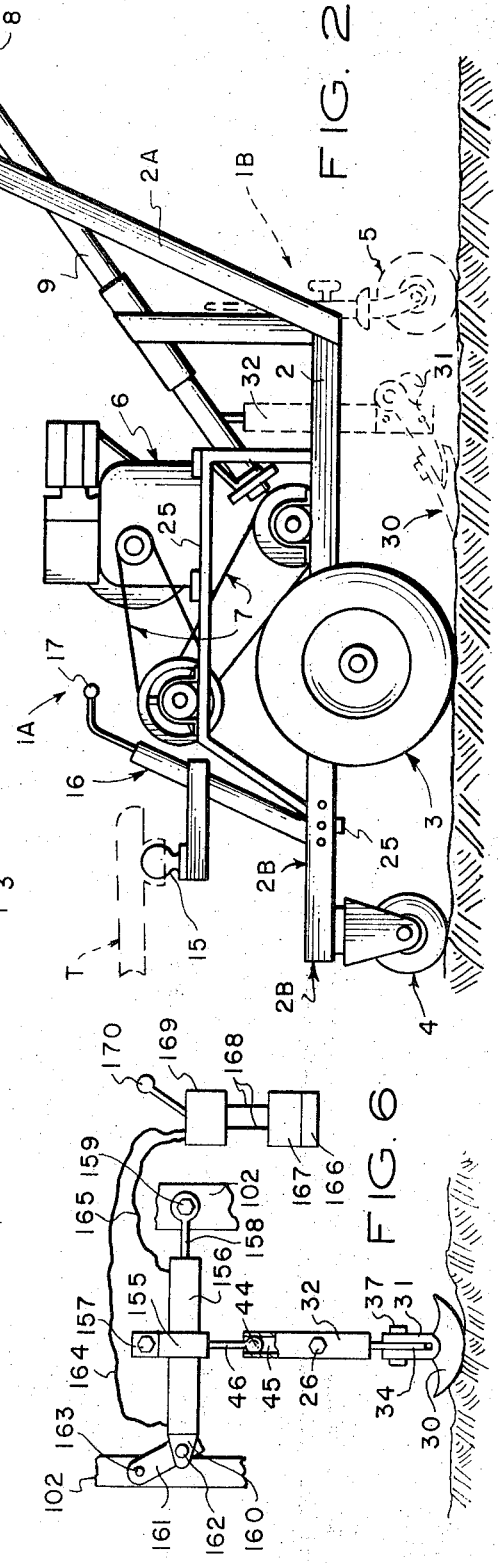

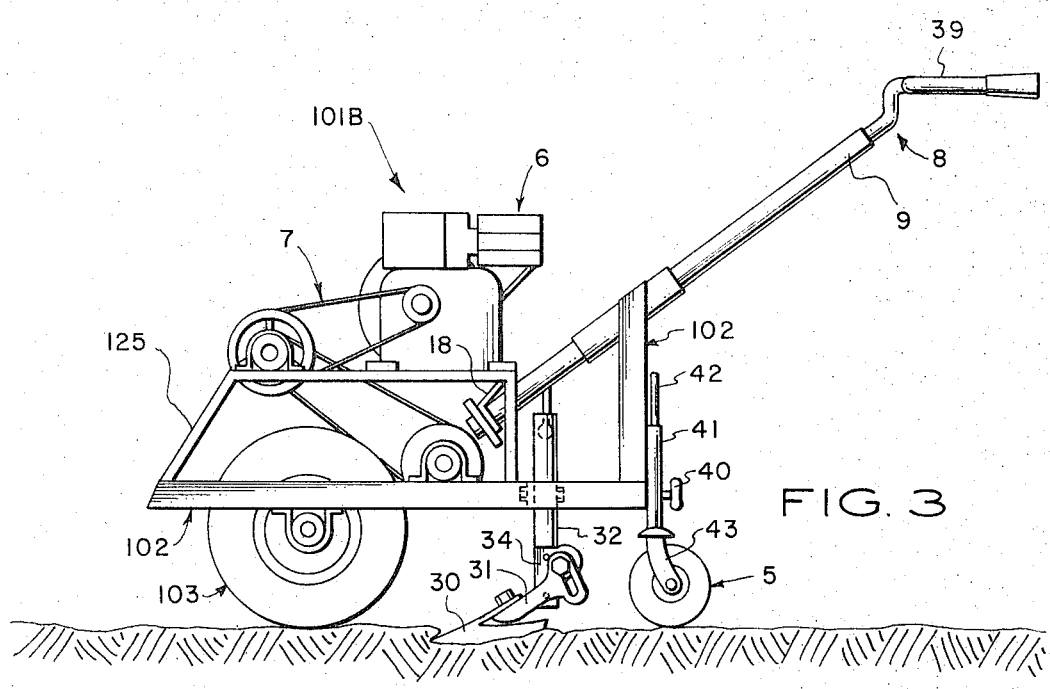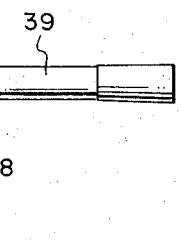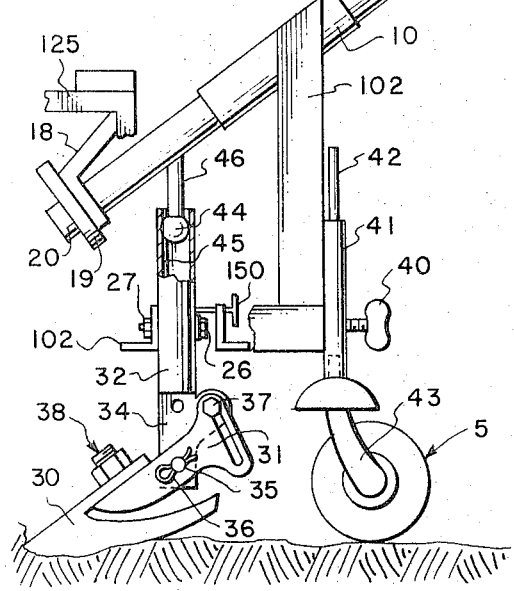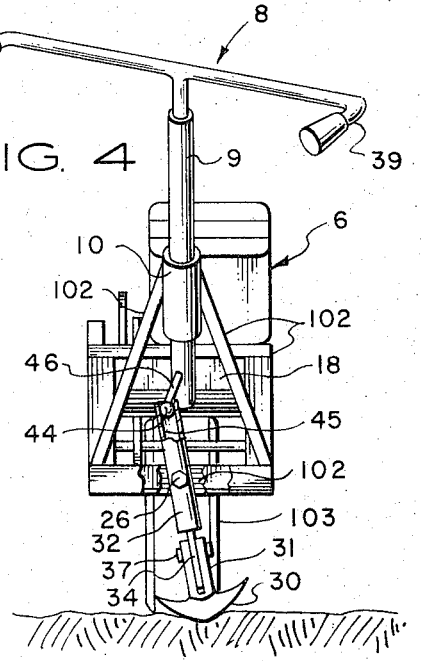

MULTI-USE UTILITY VEHICLE

This application is a continuation-in-part of my co-pending application, Ser. No. 167,349, filed July 29, 1971, for UTILITY VEHICLE, now U.S. Pat. No. 3,770,070, granted Nov. 6, 1973.

BACKGROUND OF THE INVENTION

1. Field of Invention

This invention relates generally to one-man controlled work vehicles, and more particularly to a multi-use utility vehicle that combines in a single machine the functions of cultivating the soil, moving other vehicles and transporting raw and finished materials. This is particularly adapted for use by residents of trailer homes, since this provides power means to move the trailer home, cultivate an adjacent garden and transport most of the usual products needed around a farm or home.

2. Statement of the Prior Art

The prior art discloses utility vehicles of many forms as was referenced in the above copending application. Typical, but not exclusively representative of certain features of prior art machines are the following patents:

W. V. Smith No. 1,553,919
J. A. Cowan No. 1,302,317
G. H. Nobbs No. 1,406,754
M. Bouzo No. 1,616,107 among others. None of these patents discloses any menas to combine the functions of the instant vehicle and/or to utilize the unique blade control system employed herein.

SUMMARY OF THE INVENTION

The applicant's invention in contrast to the prior art provides a special machine having an extremely simple cultivator tool that can easily be operated by the individual home-owner or other lay personnel, and with the same machine multiple functions are available.

A primary object of this invention therefore is to provide a garden cultivator that is power operated and yet extremely simple to operate and control and yet very effective for the purpose for which it is intended.

Another object is to provide a garden tractor that is extremely sturdy and durable in operation and yet light in weight for ease of handling and transport.

A further object is to provide a hand guided power cultivator that employs an extremely simple and economical construction at a key point of its effectiveness which is its universal coupling between the control mechanism and the soil engaging tool.

A still further object is to provide a cultivator of the character described that employs a familiar hand grip construction from which all control of the working and guidance of the cultivator takes place.

And yet another object of this invention is to provide in a single vehicle the multiple function of soil preparation, soil turning and cultivation as well as utility as a transport and transporting vehicle.

BRIEF DESCRIPTION OF THE DRAWING

FIG. 1 is a side elevational view of the principal embodiment of this combination-vehicle invention;

FIG. 2 is a view similar to FIG. 1, but with certain parts removed for operational expedience.

FIG. 3 is a side elevational view of a modified embodiment of this invention;

FIG. 4 is a rear view of the device of FIG. 3; and

FIG. 5 is a cut-away side view of the cultivator portion of the device of this invention.

FIG. 6 is a partially schematic cut-away view of another embodiment of the control system means for tilting the earth working means of this invention.

DESCRIPTION OF ILLUSTRATIVE EMBODIMENTS

In FIG. 1, the multi-use utility vehicle of this invention is indicated generally at 1, and it basically comprises a main frame 2, supported from the ground by a pair of spaced apart main wheels 3, a pair of spaced apart caster wheels 4, and a single trailing caster wheel 5. Located on and supported by the main frame 2 is a central power unit 6, a transmission and clutching system 7, substantially as described in more detail in the referenced copending application. Included as a part of the main frame 2 is an upstanding U-shaped guide bar 2A thru which steering of the vehicle 1 may be conducted, optionally with handlebar guide system 8.

It will also be noted in FIG. 1 that an auxiliary support frame 11 and a forward load handling extension frame 12 are superimposed on and attached to the main frame 2 by removable connections 13 & 14. When it is desired to use the vehicle 1A as a trailer mover as shown in FIG. 2, the generally L-shaped frames 11 & 12 are removed from the vehicle. When it is desired to use the vehicle of FIG. 2, including the structure shown dotted and identified as a part of vehicle 1B, the handlebar guide system 8 is employed in lieu of guide bar 2A, as will be hereafter described.

Since utility vehicles generally are part of a mature art, operating parts and structures not specifically described in detail herein may be considered equivalent to known art, or as shown in the referenced copending application.

Vehicle 1A of FIG. 2 is an inherent part of vehicle 1, having been formed by removal of parts from vehicle 1. It is particularly adapted for use as a trailer mover. The ball hitch 15 or hitch adjustment system 16 is adapted to slip under and engage a mating hitch on a trailer T shown in dotted outline. Ball hitch 15 is raised and lowered manually by crank handle 17 of screw actuated lift system 16 or alternatively by a power system as shown in said copending application. Not shown in the copending application is the use of spaced apart castor wheels 4, one on each side of rectangular frame 2 for safety support. It has been found that when a sufficiently large load is placed on ball hitch 15 such as another vehicle to be lifted and moved, a moment arm leverage occurs about the wheels 3 and the vehicle 1 A may tip forward and become inoperative for the purpose intended. However, the addition of wheels 4 prevents the occurrence of this event and thus maintains the safety and stability of this vehicle. The caster wheels 4 also permit easy steering of the vehicle whether operating under power drive from power unit 6 thru drive system 7, or operating under manual power from the operator.

The elongated front extension 2B of main frame 2 serves an additional provident purpose in that it forms the supporting base for the load handling extension frame 12 for transporting bulk material commprising two L-shaped forwardly extending side arms 12A and one or more transverse cross beams 12B to provide a load supporting platform. The ends of arms 12A each include two spaced apart paralled vertical guide bars 21 on their inboard sides and a single locking guide bar 22 on the opposite side to provide a straddle effect over frame members 2B. Lock pin 14 engages a selected one of holes 23 to retain frame 12 in place under load. The foward lower end of motor mount frame 25 is spaced from and supported below the main frame 2 to avoid interference with guides 21 & 22 and frame 12 during use.

When it is desired to use vehicle 1B as a cultivator unit the vehicle 1 may be made ready for use by removal of extension frame 12 and optionally the removal of caster wheels 4. The function and operation of vehicle 1B is determined by the selected tool 30 employed at the lower end of tool support 31 attached to support shank 32. The units shown dotted will of course be operative in this operational mode, which may best be described in relation to the modified embodiment shown in FIGS. 3–5.

In FIG. 3 it is seen that the main frame 102 is supported from a single drive wheel 103 powered from power unit 6, and a single caster wheel 5. The power unit 6 is supported from motor mount frame 125 and operates through clutch and transmission drive system 7 from controls (not shown) mounted on the control post 9 of handlebar guide system 8 in a manner as described in said copending application.

With further reference to FIGS. 4 & 5 it will be observed that a feature of this cultivator mechanism is the unique structure of a control systems means (including the steering control post 9), and the cooperating structure of the vertical tool support 32 and their mounting and interconnection to provide the operational function desired. An earth working means 50 comprises a support shank 32, tool support 31 and tool 30, which parts comprise a combination that pivots as a unit about pin 26. Control post 9 is supported from frame 102 by means of a stationary sleeve 10 which permits rotation of post 9 therein. The lower end of post 9 is also rotatively supported in cross bar 18 of motor support frame 125 by means of washer 19 and bolt 20 which axially engages the end of post 9 in a manner to permit free movement between cross bar 18 and post 9. Support shank 32 is connected to main frame 102 solely through pivot bolt 26; nut 27 is tightened to a point to permit relative movement between shank 32 and frame 102. When it is desired to hold the shank in a fixed position, a lock pin 150 supported from frame 102 engages an opening in the shank. The lower end of shank 32 includes a flat mounting area 34 to which tool support 31 is pivotally attached through pivot pin 35 secured by cotter 36. When the desired angle is obtained bolt 37 is tightened to retain the support 31 and tool 30 at the desired approach angle. The tool 30 is selected from a variety of available farm and garden tools, and is adjustably attached to support 31 by means of bolt and nut set 38. The tool shown is known in the trade as a "buzzard wing" and it is well suited for either plowing or cultivating. The tool 30 may be used for straight ahead plowing, in which case the handle bars 39 are held steady and the operator guides the vehicle in a straight direction. To do this the caster wheel 5 must be set at the desired height relative to blade 30. This is done by loosening lock screw 40 in support tube 41 to permit shaft 42 of wheel yoke 43 to be moved up or down in tube 41 until shaft 42 of wheel yoke 43 to be moved up or down in tube 41 until the proper height is desired. Tube 41 is rigidly but may be removably fastened to main frame 102 as desired. When side discharge of the dirt from a furrow is desired the turning feature of handlebar guide system 8 is employed. Near the lower end of post 9, a depending ball pin 46 is rigidly fastened to the post 9 for rotation therewith. The ball portion 44 of ball pin 46 projects into the hollow interior 45 of support shank 32 which is partially tubular in construction. The depth of projection of ball 44 into the interior 45 is such that surface engagement is maintained between the two parts during the most extreme swings of the desired tilting movement. As seen in FIG. 4, when handle bars 39 are rotated to the right, the ball pin 46 moves the upper end of shank 32 to the left by pivoting about its support pin 26 and this causes the earth being engaged by blade 30 to be churned and to slide off to the left.

Where used throughout the specification and claims, the term "control system means" refers to the combination of structures comprising:
1. Handlebar Guide System 8
2. Control Post 9
3. Ball Pin 46
4. Ball 44
5. Washer 19
6. Bolt 20

The control post 9 permits the operator to perform the functions of both steering and tool angle control.

Alternatively, the cultivator control post 32 may be swung about its pivot bolt 26 under power control by the operator under the arrangement shown in FIG. 6. In this embodiment, the ball pin 46 is rigidly attached to a clamp 155 secured in place around the periphery of hydraulic cylinder 156 by bolt 157. When cultivator control post 32 is in its vertical position, clamp 155 engages cylinder 156 at its approximate midpoint as shown. The piston 158 of this control cylinder is pivotally attached to the vehicle frame 102 by means of bolt 159. The opposite end of cylinder 156 includes an eyelet 160 pivotally attached to link arm 161 by pin 162. The upper end of arm 161 is pivotally attached to vehicle frame 102. Hydraulic lines 164 & 165 provide for reversible flow of hydraulic fluid from hydraulic pump 166 and/or accumulator 167 as required. The pump is powered from power plant 6 in a well known manner and pressurized fluid is fed thru lines 168 through control valve 169. When control lever 170 is moved to the left, pressurized fluid travels thru line 164 and cylinder 156 is moved to the left causing ball pin 46 to move to the left and tilt control post 32 to the left. This action causes cultivator blade 30 to swing slightly in a counterclockwise direction and cause blade 30 to discharge soil to the left of the trench being cultivated. When control lever 170 is moved to the right, the reverse happens and presspasses to cylinder 156 thru line 165 and the spent fluid is returned thru line 164 to accumulator 167 for recycling. During all operations, the free end of cylinder 156 can swing with link arm 161 to accommodate alignment of the cylinder 156 and piston 158 for its optimum operating angle. Using this embodiment the control post 9 will not be rotatable.

The tiltable cultivator tool means includes the control post 32 and the ball pin 46. During the manual operation of the blade tilt function, the ball pin is rotated by control post 9. However, during the hydraulic operation, the ball pin 46 is moved in a generally lateral direction by hydraulic cylinder 156 and is rigid relative to the cylinder.

I claim:

1. A utility vehicle, comprising:
   a. a frame,
   b. at least one drive wheel supporting said frame,
   c. power means on said frame for propelling said drive wheel,
   d. control system means supported from said frame,
   e. earth working means pivotally attached to said frame intermediate the length thereof for selective movement about a longitudinal axis of the vehicle,
   f. said earth working means being dynamically connected to said control system means above said longitudinal axis,
   g. said earth working means comprising a support shank having an open upper end,
   h. said control system means including a ball pin engaging said open upper end in such a manner as to provide a universal connection between said control system means and said earth working means and to transmit movement therebetween.

2. A utility vehicle as in claim 1 wherein said earth working means comprises vertically extending support shank pivoted intermediate its length to said frame and swivelmounted to said control system means at its upper end.

3. A vehicle as in claim 1, further comprising means attached to and supported from said frame for lifting and moving another vehicle.

4. A vehicle as in claim 1, further comprising means attached to and supported from said frame for transporting bulk material.

5. A multi-use vehicle as in claim 3, further comprising means attached to and supported from said frame for transporting bulk material.

6. A multi-use vehicle as in claim 5, wherein said bulk material transporting means comprises a removable extension supported by said frame.

7. A utility vehicle as in claim 6, wherein said extension comprises a pair of generally L-shaped side arms connected by at least one cross-bar.

8. A utility vehicle as in claim 7, wherein a second pair of generally L-shaped side arms are attached to the frame in an inverted position relative to the position of the first pair of side arms.

9. A power driven single wheel tractor, comprising:
   a. a frame,
   b. a single wheel mounted to and supporting said frame,
   c. power means mounted on said frame and connected in driving relation to said wheel,
   d. control system means including a control post supported from said frame,
   e. a ball pin extending from said control post,
   f. a tubular cultivator support shank pivotally mounted to said frame and swivel mounted to said ball pin,
   g. a cultivator tool attached to the lower end of said cultivator support shank, whereby rotation of said control post causes said ball pin to swing in a desired direction and simultaneously cause the tubular cultivator support shank to also swing and change the angle of application of said cultivator blade.

* * * * *